Aug. 3, 1954  J. R. GRETZINGER  2,685,371
FILTER

Filed Nov. 4, 1948  2 Sheets-Sheet 1

Inventor
John R. Gretzinger,

By Spencer, Willets, Haug & Baillio
Attorneys

Aug. 3, 1954 J. R. GRETZINGER 2,685,371
FILTER
Filed Nov. 4, 1948 2 Sheets-Sheet 2

Inventor
John R. Gretzinger,

By Spencer, Willits, Helmig & Baillio
Attorneys

Patented Aug. 3, 1954

2,685,371

UNITED STATES PATENT OFFICE 2,685,371

FILTER

John R. Gretzinger, Lake Fenton, Mich., assignor to General Motors Corporation, Detroit, Mich., a corporation of Delaware Application November 4, 1948, Serial No. 58,285

8 Claims. (Cl. 210—187)

This invention relates to filters and more particularly to an improved by-pass.

Another object of this invention is to provide a non-clogging by-pass passage to allow oil to pass through the filter to heat the oil in the filter to allow the filter to pass more oil through the filter medium and thus operate more efficiently during the warm-up period.

Another object of the invention is to provide a filter having a non-clogging bleed hole to limit the pressure on the paper filter unit.

This application is related to the copending application Serial Number 58,283 of John R. Gretzinger, filed November 4, 1948.

Other objects and advantages will be apparent from the following specification and drawings.

Figure 1:
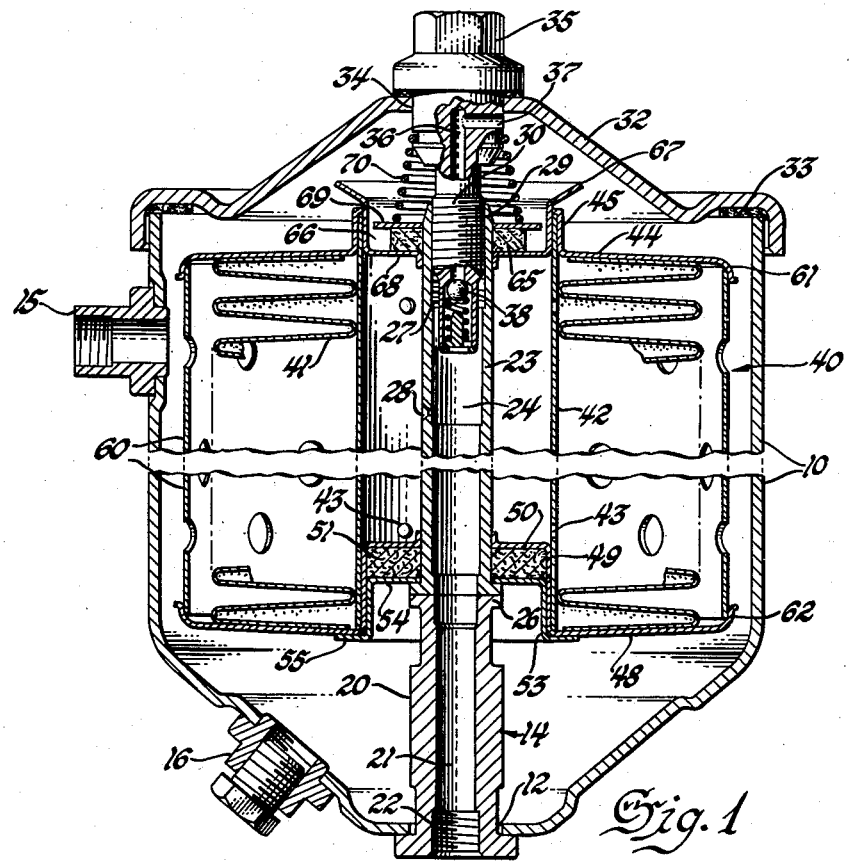
Figure 1 is a cross section of the filter.

This filter, which is especially adapted for use in the lubrication system of internal combustion engines but capable of filtering other liquids and fluids, has an outer casing 10 of a generally cylindrical shape with a tapered or conical bottom. An aperture 12, located centrally in the conical bottom of the casing 10 receives the post 14 which is secured and sealed to the casing. The inlet bushing 15 is secured in an aperture preferably near the top of the casing, while a plugged drain bushing 16 is secured in a suitable manner near the bottom of the base of the casing.

The central post 14 is hollow throughout its length and is made of a lower part 20 having a central passage 21 which has threads 22 at the end to provide for a return connection for the clean oil and an upper part 23 having a similar central passage 24. A flange 26 is provided at the meeting edges of the lower part 20 and the upper part 23 to provide a better welded or brazed joint between the parts and to provide a supporting flange for the filter unit when mounted on the support or post 14. The upper part 23 of the post has a metering orifice 28 which allows only a small quantity of oil to flow into the passage 24 in the central post 14. The upper end of the post part 23 has internal threads 27 for the reception of a bolt 30 and an external bevel 29 so that gaskets may be positioned over the post.

A dome-shaped cover 32 suitably seated on the casing 10 by a gasket 33 has a central aperture 34. The shank of bolt 30 passes through the aperture 34 in the cover and is threaded into internal threads 27 at the top of upper post part 23 until the head 35 engages the cover and holds it in position. The shank of the bolt has an axial passage 36 and an interconnected radial passage 37. The lower end of the passage is provided with a one-way ball valve 38 having an outlet to the passage 24 in the post.

The filter unit 40 employs a polygonal bellows 41 folded from a resin-impregnated filter paper as shown in the copending application Serial Number 58,283 of John R. Gretzinger, filed November 4, 1948. The bellows 41 is mounted or supported on end plates 44 and 48 and a central tube 42 perforated at 43 to allow the filtered oil to pass through the tube. The top end of the bellows 41 is glued or resin-bonded to a top plate 44. A central cylindrical flange 45 on the top plate is secured as by welding to the tube 42. The lower end of the bellows 41 is bonded to a bottom plate 48 which has a cylindrical central flange 49 secured preferably by spot welding to the tube 42. At the inner end of flange 49 an annular portion 50 of the flange provides a support for gasket 51. A gasket retaining and abutment piece has a cylindrical body 53 fitting within the cylindrical flange 49, a gasket-retaining annular flange 54 and an outer securing flange 55.

A protecting cover for the paper bellows is provided by the apertured cylindrical cover 60 made of suitable sheet material, such as resin-impregnated paper or metal. The cover 60 is held in position by the inturned flange 61 on the top plate 44 and the inturned flange 62 on the bottom plate 48.

Figure 3:
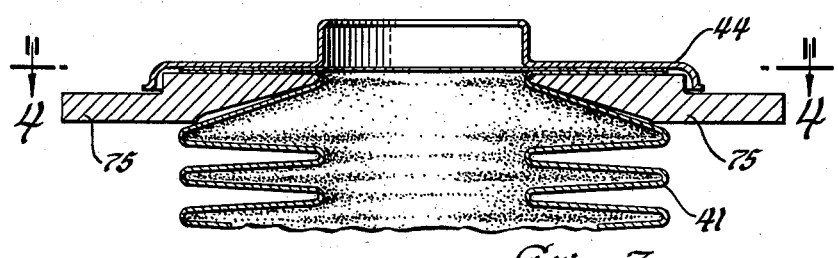
Figure 3 is a sectional view of the bellows, end plate and pressure fingers on the line 3—3 of Figure 4.
Figure 4:
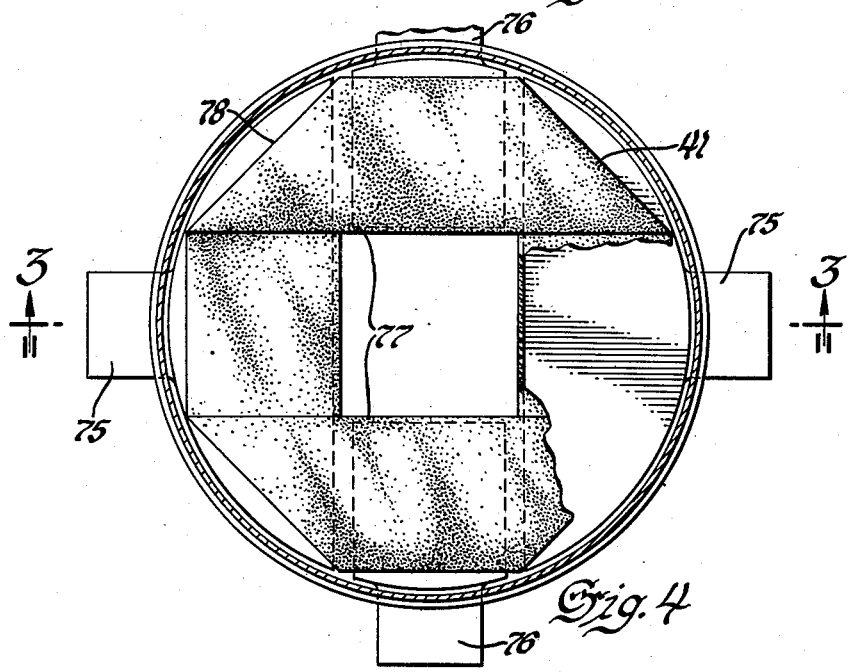
Figure 4 is a plan view on the line 4—4 of Figure 3.
Figure 5:
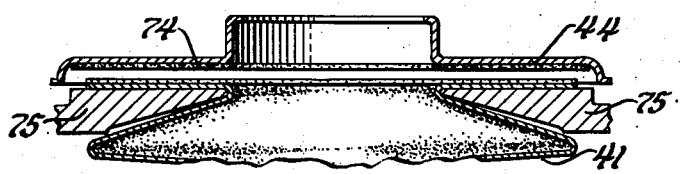
Figure 5 is a cross section of the bellows, end plate and pressure fingers before assembly.

At the top end of the filter unit 40 a seal support and handle member has a cylindrical part 66 positioned and secured in the top end of the tube 42. An outwardly flaring flange 67 on the cylindrical part 66 provides a handle to remove the filter unit 40 from the casing 10. At the inner end of the cylindrical part 66 an annular flange 68 extends inwardly to the post 23 and supports the gasket 65. A washer or apertured plate 69 is positioned on top of the gasket to protect the gasket and provide a seat for compression spring 70. The other end of spring 70 seats on the shank of bolt 30. The opposite ends of the polygonal bellows 41 are bonded to the metal end plates 44 and 48 in the same manner. Thus, though Figures 3, 4 and 5 show the specific bonded joint between the top plate 44 and the bellows, they are illustrative of the bonded joint at both ends of the filter. The top plate 44 is first coated with an annular band of resin adhesive material 74. The wide clamping fingers 75 are then positioned in the last fold or pleat on opposite sides of the bellows. The fingers 75 will clamp only a single layer of paper to the top fold plate 44 over a central square area between the lines 77, which is substantially equal to the size of the narrow clamping fingers 76. At the ends of the last folds or pleats outside of the lines 77, the wide clamping fingers 75 engage a double thickness over a triangular area. The narrow clamping fingers 76 extend into the second pair of opposed pleats from the end of the bellows, which extends transversely to the first pleat, and engage a substantially square portion of double thickness of the bellows.

Then the fingers 75 and 76 are clamped against the plate 44 in a fixture (not shown). The space between the wide clamping fingers and the narrow clamping fingers will not interfere with the proper and continuous bonding of the bellows 41 to the end plate 44, since the fingers engage the same thickness of paper on both sides. The wide fingers 75 are clamped with sufficient pressure to compress the double layer of paper, particularly in the triangular end regions, to the same thickness as a single layer. Thus pressure is applied to both the square central region with one thickness of paper and the triangular end portions having a double thickness.

The paper has a resin content sufficient to increase the wet strength so that the filter unit will withstand the filter operating pressure. Under normal conditions filter papers with a thermosetting resin content of between 25% and 60% are satisfactory.

When the heat and pressure is applied to seal the end of the bellows 41 to the plate 44 by means of the resin 74, the resin-impregnated paper in the bellows will seal together along the lines 77 which extend between the square area of single thickness paper and the triangular area of double thickness paper. The two overlapping layers of the filter paper must be sealed together to prevent leakage between the layers of paper at the fold at the end of the lines 77. Though the double layers may be sealed all along both lines 77 as they traverse the width of the other pleats, it is crucial and necessary that they be sealed at the apex of each of the four triangles between the ends of the lines 77 and outer diagonal corner folds 78 of the pleats. These layers are sealed together at this point by employing a high bonding pressure to compress the double layer to a single thickness with high resin content paper. With lower bonding pressures or resin content it may be necessary to locally increase the bonding pressure or to add resin at this point or both.

When this filter is employed in the lubrication system of internal combustion engines the oil line from the pump is connected to the bushing 15 of the casing 10. The oil fills the casing and surrounds the filter unit 40. The oil passes through the apertured guard cover 60, and then through the filtering bellows 41 where it is filtered. The tube 42 is apertured at 43 to allow the oil to pass freely through the tube to the metering orifice 28 in the side wall of hollow post 14. This orifice 28 is made small enough to limit the fluid flow to the normal amount of fluid that is filtered. Thus if the filter paper bellows 41 breaks or the filter element is left out of the filter, the oil flow through the system will not be unduly increased, and thus the pressure at the pump outlet dangerously reduced. The oil then flows through the central passages 24 and 21 of post 14 to the outlet. If the bellows 41 is clogged the oil will flow through by-pass passages 37 and 36 and valve 38 directly to the outlet passages 24 and 21 in post 14.

Figure 2:
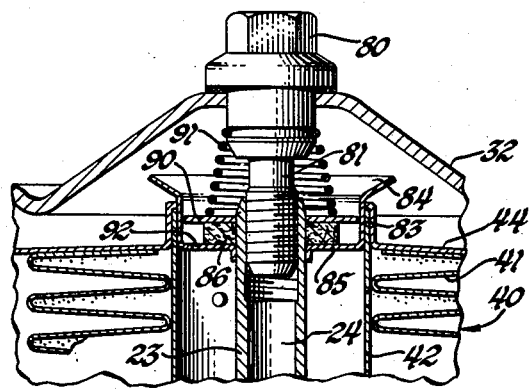
Figure 2 is a fragmentary view showing a modification.

This full-flow filter may be modified as shown in Figure 2 to provide a shunt-flow filter. The casing cover 32 and central post 23 are the same as shown in Figure 1. The bolt 80 has a shank 81 with a threaded end engaging the internal threads 27 of post 23 to secure the cover to the casing similar to bolt 30, but the internal passages and valve are omitted. The filter unit 40 has the same filter bellows 41, central tube 42 and upper and lower end plate construction 44 and 48.

At the upper end a cylindrical sleeve 83 is secured within the tube 42. An angularly disposed flange 84 extends outwardly from the tube to provide a handle, and an inwardly disposed annular flange 85 extends inwardly and engages the post 24 and supports the gasket 86 which closely surrounds the post but does not engage the tube. A washer or apertured plate 90 holds the gasket 86 in place and provides a seat for compression spring 91 which seats on the shank 81 of the bolt.

In order to continuously by-pass a small quantity of oil through this filter a small aperture or bleed hole 92 having a diameter of about 45 thousandths of an inch is placed in the annular portion of the gasket support flange 85 outside the outer diameter of the gasket 86. This aperture will prevent total stoppage of the flow when the filter is clogged and will permit sufficient flow to warm the oil in the filter when the oil is too cold to pass through the filter material.

In order to prevent aperture 92 from clogging the washer 90 is made slightly smaller than the diameter of the inner wall of cylindrical sleeve 83. It is preferable to maintain the width of the annular space between the washer 90 and the cylindrical sleeve 83 less than the diameter of the aperture 92. Due to the elongated nature of the peripheral slot between the washer and sleeve 83, it will not clog, and will prevent large particles from entering and clogging the aperture 92 or strain the fluid flowing to aperture 92. The washer 90 may be arranged or constructed to move to dislodge accumulated particles, and thus maintain the peripheral slot open. The washer 90 will move due to vibration and pressure changes if resiliently mounted on an additional spring, or if gasket 86 is made of resilient material such as synthetic rubber. Similar movement may be obtained by enlarging the internal aperture to freely mount the washer 90 for limited movement.

The above described embodiments are illustrative of the invention. Numerous modifications may be made by those skilled in the art within the scope of the appended claims.

I claim:

1. A filter casing having an inlet and an outlet opening, a hollow post secured at one end to one of said openings, a cover for said casing, means securing said cover to said casing and closing the other end of said post, an apertured tube surrounding said post, filter means covering said apertures, a seal adjacent each end of said tube between said tube and post, said post having an orifice between said seals, one of said seals comprising an annular plate within said tube, a gasket surrounding said post and a washer within said tube seated on said gasket, said plate having a bleed hole adjacent said gasket, and said washer being shaped to fit said tube with a clearance less than the diameter of said bleed hole to prevent impurities from clogging the bleed hole.

2. A filter casing having an inlet and an outlet opening, a hollow post secured at one end to one of said openings, a cover for said casing, means securing said cover to said casing and closing the other end of said post, an apertured tube surrounding said post, plates secured to the ends of said tube, a bellows filter bonded to said plates, a seal adjacent each end of said tube between said tube and post, said post having an orifice between said seals, one of said seals comprising an annular plate within said tube, a gasket surrounding said post and a washer within said tube seated on said gasket, and said plate having a bleed hole adjacent said gasket, said washer being shaped to fit said tube with a clearance less than the diameter of said bleed hole to prevent impurities from clogging the bleed hole.

3. A filter casing having an inlet and an outlet opening, a filter support connected to said outlet opening, filtering means covering a portion of said support, said support having a recess, said support having a small continuously open bleed hole in the base of said recess, and a strainer positioned in said recess and spaced from said bleed hole and spaced from the wall of said recess a distance less than the diameter of said bleed hole for a length at least greater than the diameter of the bleed hole to prevent any large particles from clogging said bleed hole.

4. A filter casing having an inlet and an outlet opening, a filter support connected to said outlet opening, a paper bellows filter unit bonded to and covering a portion of said support, said support having a recess, said support having a small continuously open bleed hole in the base of said recess, and means positioned in said recess and spaced from said bleed hole and spaced from the wall of said recess a distance less than the diameter of said bleed hole over a distance greater than the diameter of said bleed hole to prevent any large particles from clogging said bleed hole.

5. In a filter unit, a filter casing having an inlet and an outlet opening, filtering means positioned between said inlet and outlet openings, said filtering means having a small continuously open bleed hole to continuously by-pass a small quantity of liquid, and a strainer on the inlet side of said bleed hole to prevent large particles from entering and clogging said bleed hole.

6. In a filter unit, a filter casing having an inlet and an outlet opening, filtering means positioned between said inlet and outlet openings, said filtering means having a small continuously open bleed hole to continuously by-pass a small quantity of the liquid, a wall on the inlet side adjacent said hole, flow control means spaced from said bleed hole, and said flow control means being adjacent said wall and spaced therefrom to provide a small peripheral space between said flow control means and said wall to prevent large particles from entering and clogging said bleed hole.

7. In a filter unit, a filter casing having an inlet and an outlet opening, filtering means positioned between said inlet and outlet openings, said filtering means having a bleed hole to continuously by-pass a small quantity of liquid, a wall on the inlet side surrounding said bleed hole, and a plate spaced from said bleed hole and having a perimeter spaced from said wall a distance less than the diameter of said bleed hole for a distance greater than the diameter of said bleed hole.

8. The invention defined in claim 7, means positioning said plate for movement to dislodge particles tending to clog said space.

References Cited in the file of this patent

UNITED STATES PATENTS

| Number | Name | Date |
|---|---|---|
| Re. 18,144 | Lundberg | June 30, 1931 |
| 609,769 | Barr | Aug. 30, 1898 |
| 1,401,976 | Giovannoni | Jan. 3, 1922 |
| 2,164,966 | Tutein | July 4, 1936 |
| 2,186,440 | Williams | Jan. 9, 1940 |
| 2,311,320 | Williams | Feb. 16, 1943 |
| 2,392,901 | Brown | Jan. 15, 1946 |
| 2,410,371 | Vokes | Oct. 29, 1946 |
| 2,430,578 | Matlock | Nov. 11, 1947 |
| 2,440,339 | Langer | Apr. 27, 1948 |
| 2,447,680 | Bauer | Aug. 24, 1948 |
| 2,454,033 | Briggs | Nov. 16, 1948 |
| 2,556,521 | Chase | June 12, 1951 |

FOREIGN PATENTS

| Number | Country | Date |
|---|---|---|
| 401,287 | Great Britain | Oct. 30, 1933 |